US012792266B2

(12) United States Patent
Qi et al.

(10) Patent No.: US 12,792,266 B2
(45) Date of Patent: Nov. 10, 2026

(54) MEMORY SYSTEMS AND OPERATION METHODS THEREOF, AND STORAGE MEDIUMS

(71) Applicant: Yangtze Memory Technologies Co., Ltd., Wuhan (CN)

(72) Inventors: Wei Qi, Wuhan (CN); Da Li, Wuhan (CN); Xinran Li, Wuhan (CN); Yaoyao Tian, Wuhan (CN); Ya Wang, Wuhan (CN); Guoqi Ji, Wuhan (CN); Wenping Chen, Wuhan (CN); Shuai Zhang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 59 days.

(21) Appl. No.: 18/611,394

(22) Filed: Mar. 20, 2024

(65) Prior Publication Data

US 2025/0173092 A1 May 29, 2025

(30) Foreign Application Priority Data

Nov. 29, 2023 (CN) ......................... 202311624982.7

(51) Int. Cl.
*G06F 3/00* (2006.01)
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0652* (2013.01); *G06F 12/0246* (2013.01); *G06F 2212/7202* (2013.01); *G06F 2212/7205* (2013.01)

(58) Field of Classification Search
CPC ..... G06F 3/0659; G06F 3/0604; G06F 3/0652
See application file for complete search history.

(56) References Cited

U.S. PATENT DOCUMENTS

| | | | | |
|---|---|---|---|---|
| 9,747,200 | B1 * | 8/2017 | Micheloni | G06F 12/0246 |
| 10,403,379 | B1 * | 9/2019 | Kuo | G11C 29/44 |
| 2019/0138226 | A1 * | 5/2019 | Kanno | G06F 3/0679 |
| 2023/0030620 | A1 * | 2/2023 | Lee | G06F 3/0652 |
| 2024/0103737 | A1 * | 3/2024 | Punzo | G06F 3/0619 |

* cited by examiner

*Primary Examiner* — Reginald G Bragdon
*Assistant Examiner* — Michael L Westbrook
(74) *Attorney, Agent, or Firm* — Hanley, Flight & Zimmerman, LLC

(57) ABSTRACT

Examples of the present application provide a memory system and an operation method thereof, and a storage medium. The memory system includes: a memory device including memory blocks; and a memory controller coupled with the memory device and configured to: in response to a write command, based on a data retention parameter of each of the memory blocks, determine a second memory block from first memory blocks among the memory blocks, the first memory blocks being at least partly in an erased state, wherein the second memory block is a first memory block with a maximum data retention parameter among the first memory blocks; and write to-be-written data to the second memory block.

20 Claims, 7 Drawing Sheets

MEMORY SYSTEMS AND OPERATION METHODS THEREOF, AND STORAGE MEDIUMS

CROSS REFERENCE TO RELATED APPLICATION

This application claims priority to and the benefit of Chinese Patent Application 202311624982.7, filed on Nov. 29, 2023, which is hereby incorporated by reference in its entirety.

TECHNICAL FIELD

Examples of the present application relate to the technical field of semiconductors, and =, namely, to memory systems and operation methods thereof, and storage mediums.

BACKGROUND

A memory device is a storage apparatus used to save information in a modern information technique. As a typical non-volatile semiconductor memory, a Not-And (NAND) memory gradually becomes a mainstream product in the memory market due to a higher storage density, controllable production costs, suitable program and erase speeds, and a retention characteristic.

Figure 1:
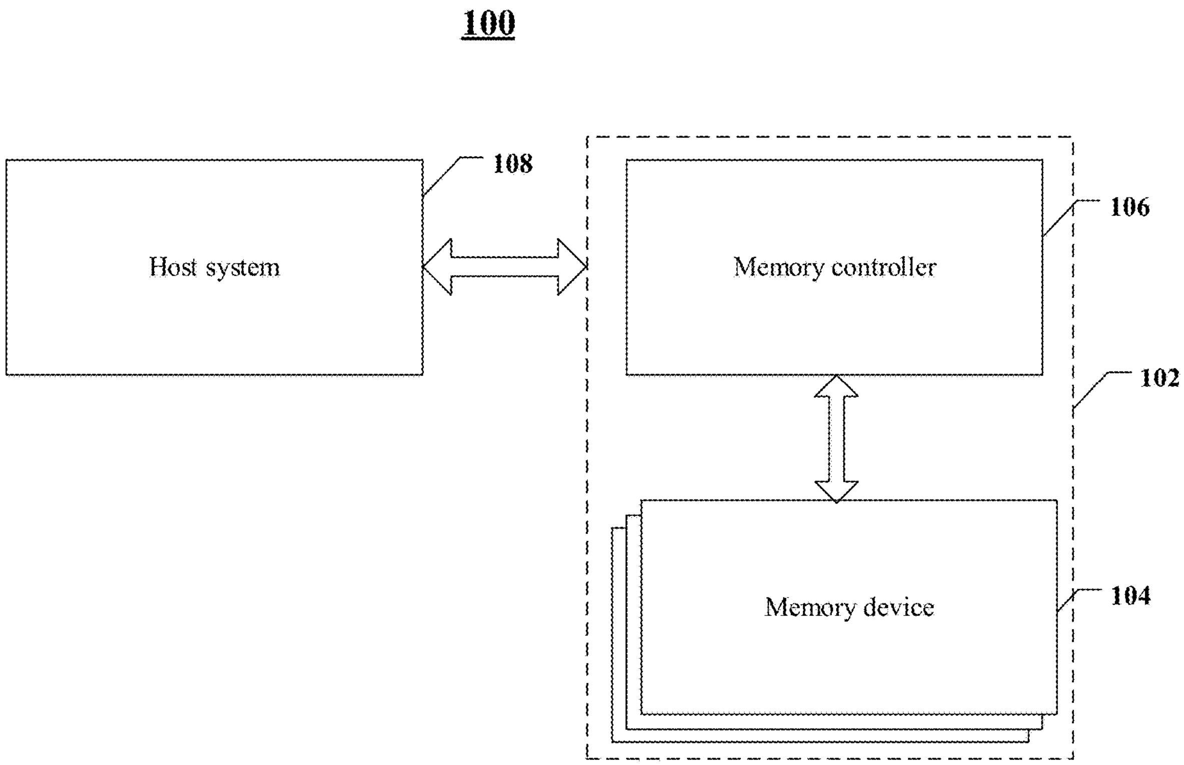
FIG. 1 is a schematic diagram of an example system having a memory system according to an example of the present application.

In the above drawings (not necessarily drawn to scale), like reference numerals may describe like components in different views. Like reference numerals having different letter suffixes may represent different examples of like components. The drawings illustrate generally, by way of example, but not by way of limitation, various examples as discussed herein.

DETAILED DESCRIPTION

Example implementations disclosed by the present application will be described below in more details with reference to the drawings. Although example implementations of the present application are shown in the drawings, it is to be understood that, the present application may be implemented in various forms without being limited by the implementations as set forth herein. Rather, these implementations are provided in order for understanding the present application more thoroughly, and can fully convey the scope disclosed by the present application to those skilled in the art.

In the description below, many example details are presented to provide a more thorough understanding of the present application. However, it is apparent to those skilled in the art that the present application may be carried out without one or more of these details. In other examples, in order to avoid confusing with the present application, some technical features well-known in the art are not described; that is, not all features of actual examples are described herein, and well-known functions and structures are not described in detail.

In the drawings, sizes and relative sizes of layers, areas and elements may be exaggerated for clarity. Same reference numerals denote same elements throughout.

It is to be understood that when an element or a layer is referred to as being "on", "adjacent to", "connected to", or "coupled to" other elements or layers, it may be directly on, adjacent to, connected to, or coupled to the other elements or layers, or intervening elements or layers may be present. In contrast, when an element is referred to as being "directly on", "directly adjacent to", "directly connected to", or "directly coupled to" other elements or layers, no intervening elements or layers are present. It is to be understood that, although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present application. When the second element, component, area, layer or portion is discussed, it does not mean that the first element, component, area, layer or portion is necessarily present in the present application.

The spatially relative terms, such as "beneath", "below", "lower", "under", "over", "upper", and the like, may be used herein for ease of description to describe one element or feature's relationship to other elements or features as illustrated in the figures. It is to be understood that, the spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may comprise both upper and lower orientations. The device may be orientated otherwise (rotated by 90 degrees or other orientations), and the spatially descriptive terms used herein are interpreted accordingly.

The terms used herein are only intended to describe the examples, and are not used as limitations of the present application. As used herein, unless otherwise indicated expressly in the context, "a", "an", and "the" in a singular form are also intended to comprise a plural form. It is also to be understood that the terms "consist of" and/or "comprise", when used in this specification, determine the presence of the feature, integer, step, operation, element and/or component, but do not preclude the presence or addition of one or more of other features, integers, steps, operations, elements, components, and/or groups. As used herein, the term "and/or" comprises any or all combinations of the listed relevant items.

In order to be capable of understanding the characteristics and the technical contents of the examples of the present application in more details, implementation of the examples of the present application is set forth in detail below in conjunction with the drawings, and the appended drawings are only used for reference and illustration, instead of being used to limit the examples of the present application.

The memory device in the examples of the present application include, but is not limited to, a three-dimensional NAND memory. In order to facilitate understanding, the illustration is made by taking the three-dimensional NAND memory as an example.

FIG. 1 illustrates a block diagram of an example system 100 having a memory device according to some aspects of the present application. The system 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having storages therein. As shown in FIG. 1, the system 100 may comprise a host system 108 and a memory system 102. The memory system 102 has one or more memory devices 104 and a memory controller 106. The host system 108 may be a processor (e.g., a central processing unit (CPU)) or a system on chip (SOC) (e.g., an application processor (AP)) of an electronic apparatus. The host system 108 may be configured to send or receive data to or from the memory devices 104.

According to some implementations, the memory controller 106 is coupled to the memory devices 104 and the host system 108, and configured to control the memory devices 104. The memory controller 106 can manage data stored in the memory devices 104 and communicate with the host system 108. In some implementations, the memory controller 106 is designed for operating in a low duty-cycle environment such as a Secure Digital (SD) card, a Compact Flash (CF) card, a Universal Serial Bus (USB) flash drive, or other media for use in electronic apparatuses, such as a personal computer, a digital camera, and a mobile phone, etc. In some implementations, the memory controller 106 is designed for operating in a high duty-cycle environment such as a Solid State Disk (SSD) or an embedded Multi-Media Card (eMMC) which is used as a data storage for a mobile apparatus, such as a smartphone, a tablet, or a laptop computer, etc., and an enterprise memory array.

The memory controller 106 may be configured to control operations of the memory devices 104, such as read, erase, and program operations. The memory controller 106 may be further configured to manage various functions with respect to data stored or to be stored in the memory devices 104, including, but not limited to, bad-block management, garbage collection, logical-to-physical address translation, and wear leveling, etc. In some implementations, the memory controller 106 is further configured to process an error correction code (ECC) with respect to the data read from or written to the memory devices 104. The memory controller 106 may further perform any other suitable functions, e.g., formatting the memory devices 104. The memory controller 106 may communicate with an external apparatus (e.g., the host system 108) according to an example communication protocol. For example, the memory controller 106 may communicate with the external apparatus through at least one of various interface protocols, such as a USB protocol, an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a Firewire protocol, etc.

Figure 2A:
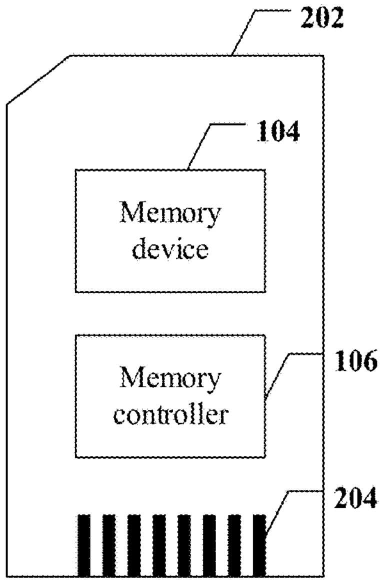
FIG. 2A is a schematic diagram of an example memory card having a memory system according to an example of the present application.
Figure 2B:
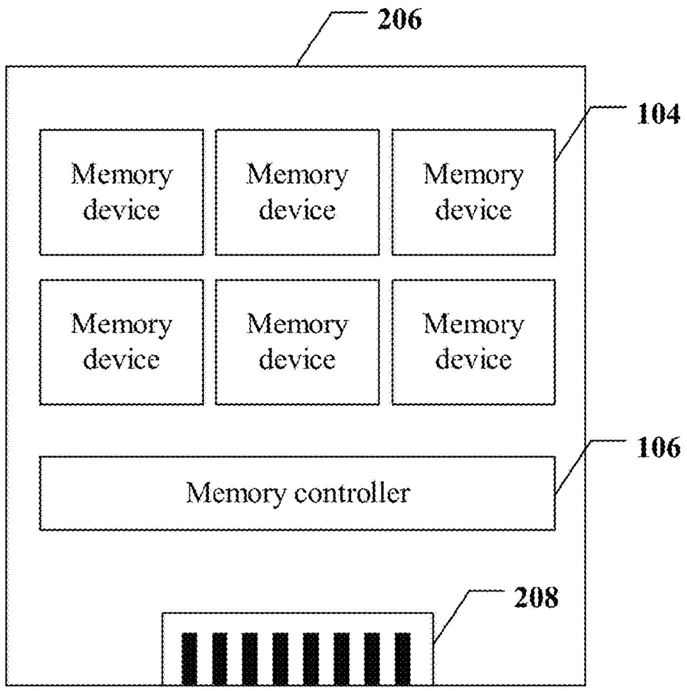
FIG. 2B is a schematic diagram of an example solid state disk having a memory system according to an example of the present application.

The memory controller 106 and the one or more memory devices 104 can be integrated into various types of storage apparatuses, for example, be included in the same package (such as a Universal Flash Storage (UFS) package or an eMMC package). That is, the memory system 102 may be implemented and packaged into different types of end electronic products. In one example as shown in FIG. 2A, the memory controller 106 and a single memory device 104 may be integrated into a memory card 202. The memory card 202 may include a PC card (Personal Computer Memory Card International Association (PCMCIA)), a CF card, a Smart Media (SM) card, a memory stick, a Multi-Media Card (MMC, RS-MMC, MMCmicro), an SD card (SD, miniSD, microSD, SDHC), and a UFS, etc. The memory card 202 may further comprise a memory card connector 204 coupling the memory card 202 with a host (e.g., the host system 108 in FIG. 1). In another example as shown in FIG. 2B, the memory controller 106 and a plurality of memory devices 104 may be integrated into an SSD 206. The SSD 206 may further comprise an SSD connector 208 coupling the SSD 206 with a host (e.g., the host system 108 in FIG. 1). In some implementations, at least one of a storage capacity or an operation speed of the SSD 206 is greater than at least one of a storage capacity or an operation speed of the memory card 202.

Figure 3A:
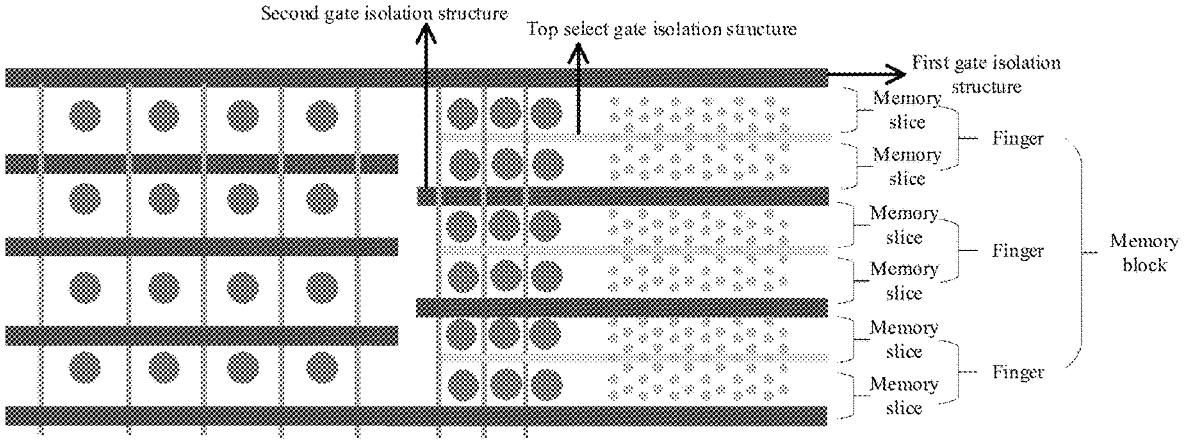
FIG. 3A is a schematic distribution diagram of memory cells of a three-dimensional NAND memory according to an example of the present application.

FIG. 3A provides an example of a schematic structural diagram of a memory cell array of a three-dimensional NAND memory. As shown in FIG. 3A, the memory cell array of the three-dimensional NAND memory is composed of several parallel and staggered memory cell rows that are parallel to a gate isolation structure. Each several memory cell rows are separated by the gate isolation structure and a top select gate isolation structure, and each memory cell row comprises a plurality of memory cells. The gate isolation structure may comprise a first gate isolation structure and a second gate isolation structure. The first gate isolation structure divides the memory cell array into a plurality of memory blocks, and a plurality of second gate isolation structures may divide a memory block into a plurality of fingers. The top select gate isolation structure disposed in each finger may divide a finger into two portions, thus dividing the finger into two memory slices. One memory block shown in FIG. 3A comprises 6 memory slices, and in practical applications, the number of memory slices in one memory block is not limited thereto.

In some examples, each memory block may be coupled with a plurality of word lines It is to be noted that the number of memory cell rows between the gate isolation structure and the top select gate isolation structure provided in FIG. 3A is merely an example illustration, which is not used to limit the number of memory cell rows contained in one finger of the three-dimensional NAND memory in the present application. In practical applications, the number of memory cell rows contained in one finger may be adjusted to, for example, 2, 4, 8, and 16, etc., according to practical situations.

Figure 3B:
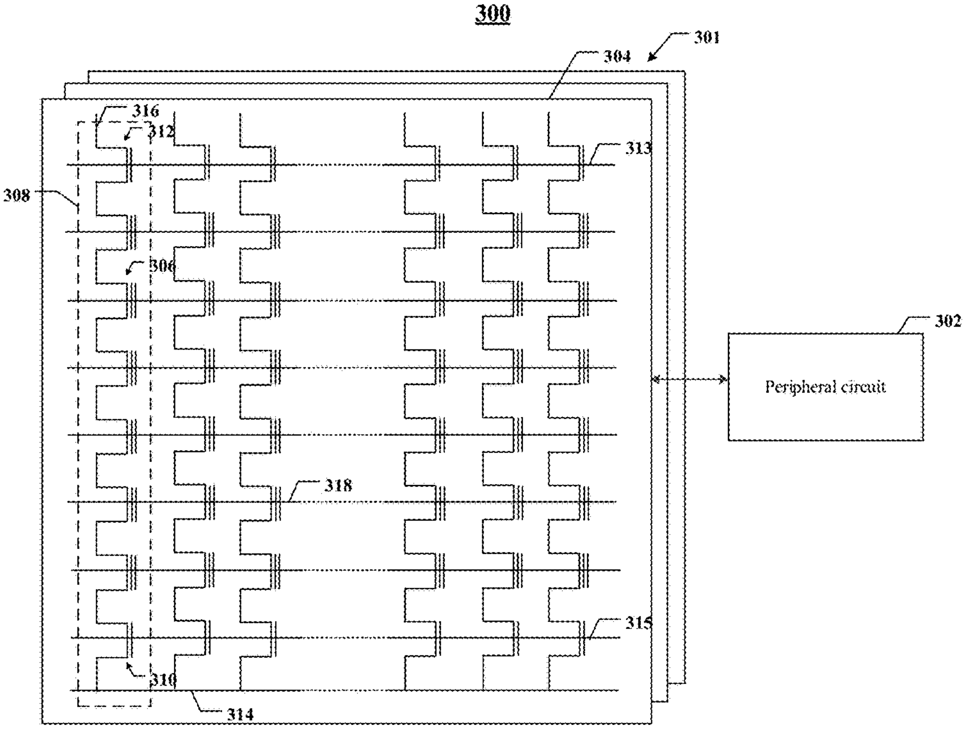
FIG. 3B is a schematic diagram of an example memory comprising a peripheral circuit according to an example of the present application.

FIG. 3B illustrates a schematic circuit diagram of an example memory device 300 comprising a peripheral circuit according to some aspects of the present application. The memory device 300 may be an example of the memory devices 104 in FIG. 1. The memory device 300 may comprise a memory cell array 301 and a peripheral circuits 302 coupled to the memory cell array 301. An illustration is made by taking the memory cell array 301 being a three-dimensional NAND memory cell array as an example, wherein memory cells 306 are NAND memory cells and are provided in an array of memory strings 308, with each memory string 308 extending vertically above a substrate (not shown). In some implementations, each memory string 308 comprises a plurality of memory cells 306 that are coupled in series and stacked vertically. Each memory cell 306 can hold a continuous analog value, such as a voltage or charge, which depends on the number of electrons trapped within a region of the memory cell 306. Each memory cell 306 may be either a floating gate memory cell including a floating gate transistor, or a charge trap memory cell including a charge trap transistor.

In some implementations, each memory cell 306 is a single-level cell (SLC) having two possible storage states and therefore can store one bit of data. For example, a first storage state "0" may correspond to a first voltage range, and a second storage state "1" may correspond to a second voltage range. In some implementations, each memory cell 306 is a multi-level cell (MLC) capable of storing more than one bit of data in more than four storage states. For example, the MLC may store two bits per cell (also referred to as a Double-Level Cell), three bits per cell (also referred to as a Trinary-Level Cell (TLC)), four bits per cell (also referred to as a Quad-Level Cell (QLC)), five bits per cell (also referred to as a Penta-Level Cell (PLC)), or more than five bits per cell. Each MLC may be programmed to assume a range of possible nominal storage values. In an example, if each MLC stores two bits of data, the MLC can be programmed to employ one of three possible programmed levels from an erased state by writing one of three possible nominal storage values to the cell, and a fourth nominal storage value may be used to represent the erased state.

As shown in FIG. 3B, each memory string 308 may comprise a bottom select transistor 310 (also referred to as a source-side select transistor, which comprises a source select gate BSG) at a source terminal thereof and a top select transistor 312 (also referred to as a drain-side select transistor, which comprises a drain select gate TSG) at a drain terminal thereof. The source select transistor BSG 310 and the drain select transistor TSG 312 may be configured to activate a selected memory string 308 during read and program operations. In some implementations, sources of the memory strings 308 in the same memory block 304 are coupled through the same source line (SL) 314 (e.g., a common SL). In other words, according to some implementations, all the memory strings 308 in the same memory block 304 have an array common source (ACS). According to some implementations, the TSG 312 of each memory string 308 is coupled to a respective bit line (BL) 316 which data can be read from or written to via an output bus (not shown). In some implementations, each memory string 308 is configured to be selected or unselected by applying a select voltage (e.g., above a threshold voltage of the transistor having the TSG 312) or an unselect voltage (e.g., 0 V) to the respective TSG 312 via one or more TSG lines 313 and/or by applying a select voltage (e.g., above a threshold voltage of the transistor having the BSG 310) or an unselect voltage (e.g., 0 V) to the respective BSG 310 via one or more BSG lines 315.

As shown in FIG. 3B, the memory strings 308 can be organized into a plurality of memory blocks 304, and each of plurality of the memory blocks 304 may have a common source line 314 (e.g., coupled to the ground). In some implementations, each memory block 304 is a basic data unit for the erase operation, i.e., all of the memory cells 306 on the same memory block 304 are erased at the same time. In order to erase the memory cells 306 in a selected memory block 304, the source line 314 coupled to the selected memory block 304 as well as unselected memory blocks 304 that are in the same plane as the selected memory block 304 can be biased with an erase voltage (Vers) (e.g., a high positive voltage (such as 20 V or higher)). It is to be understood that in some examples, an erase operation may be performed at a half memory block level, a quarter memory block level, or a level having any suitable number of memory blocks or any suitable fractions of a memory block. The memory cells 306 of adjacent memory strings 308 may be coupled through a word line 318, and a row of memory cells 306 selected by the word line 318 is affected by the read and program operations. In some implementations, with reference to above FIG. 3A, a plurality of memory cells are separated from each other by the top select gate isolation structure and the gate isolation structure, a plurality of memory cells between the top select gate isolation structure and the gate isolation structure are arranged into a plurality of memory cell rows, and each memory cell row is parallel to the gate isolation structure and the top select gate isolation structure. The memory cells in memory slices sharing the same word line form a physical page.

Referring to FIGS. 3A and 3B, each of the plurality of memory cells 306 is coupled to the respective word line 318, and each memory string 308 is coupled to the respective bit line 316 through a respective select transistor (such as the top select transistor (TSG) 312).

Figure 4:
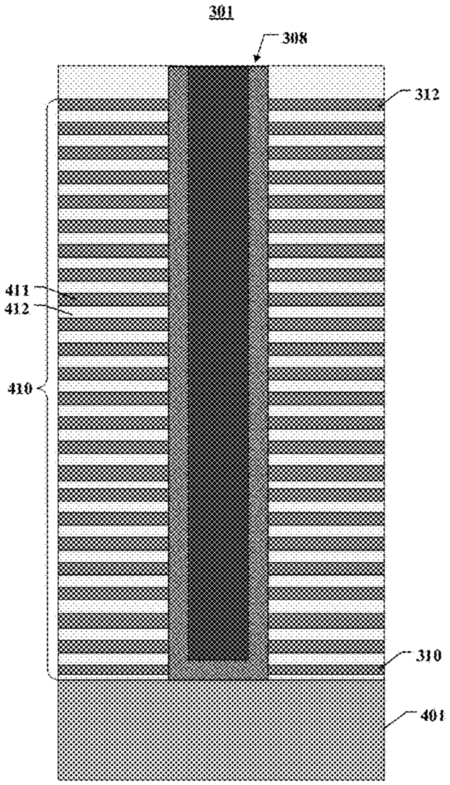
FIG. 4 is a schematic cross-sectional view of a memory cell array comprising a NAND memory string according to an example of the present application.

FIG. 4 illustrates a schematic cross-sectional view of an example memory cell array 301 comprising a memory string 308, which for example is NAND, according to some aspects of the present application. As shown in FIG. 4, the NAND memory cell array 301 may comprise a stack structure 410. The stack structure 410 comprises a plurality of gate layers 411 and a plurality of insulation layers 412 that are disposed sequentially and alternately in stack, and a channel structure penetrating through the gate layers 411 and the insulation layers 412 vertically. The channel structure is coupled with each gate layer to form one memory cell, and the channel structure is coupled with the plurality of gate layers in the stack structure 410 to form the memory string 308. The gate layers 411 and the insulation layers 412 may be in stack alternately, and two adjacent ones of the gate layers 411 are separated by one insulation layer 412.

A constituent material of the gate layer 411 may include a conductive material. The conductive material includes, but is not limited to, tungsten (W), cobalt (Co), copper (Cu), aluminum (Al), polysilicon, doped silicon, silicides, or any combination thereof. In some implementations, each gate layer 411 comprises a metal layer, e.g., a tungsten layer. In some implementations, each gate layer 411 comprises a doped polysilicon layer. Each gate layer 411 may comprise a control gate around the memory cells. The gate layer 411 at the top of the stack structure 410 may extend laterally as a top select gate line; the gate layer 411 at the bottom of the stack structure 410 may extend laterally as a bottom select gate line; and the gate layer 411 extending laterally between the top select gate line and the bottom select gate line may act as a word line layer.

In some examples, the stack structure 410 may be disposed on a substrate 401. The substrate 401 may include silicon (e.g., monocrystalline silicon), silicon germanium (SiGe), gallium arsenide (GaAs), germanium (Ge), silicon on insulator (SOI), germanium on insulator (GOI), or any other suitable materials.

In some examples, a memory string 308 comprises the channel structure that extends through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel comprises silicon, e.g., polysilicon. In some implementations, the memory film is a composite dielectric layer including a tunneling layer, a storage layer (also referred to as a "charge trap/storage layer"), and a blocking layer. The channel structure may have a cylindrical shape (e.g., a pillar shape). According to some implementations, the semiconductor channel, the tunneling layer, the storage layer, and the blocking layer are arranged radially from the center of the pillar toward the outer surface of the pillar in this order. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In an example, the memory film may include a composite layer of silicon oxide/silicon oxynitride/silicon oxide (ONO).

Figure 5:
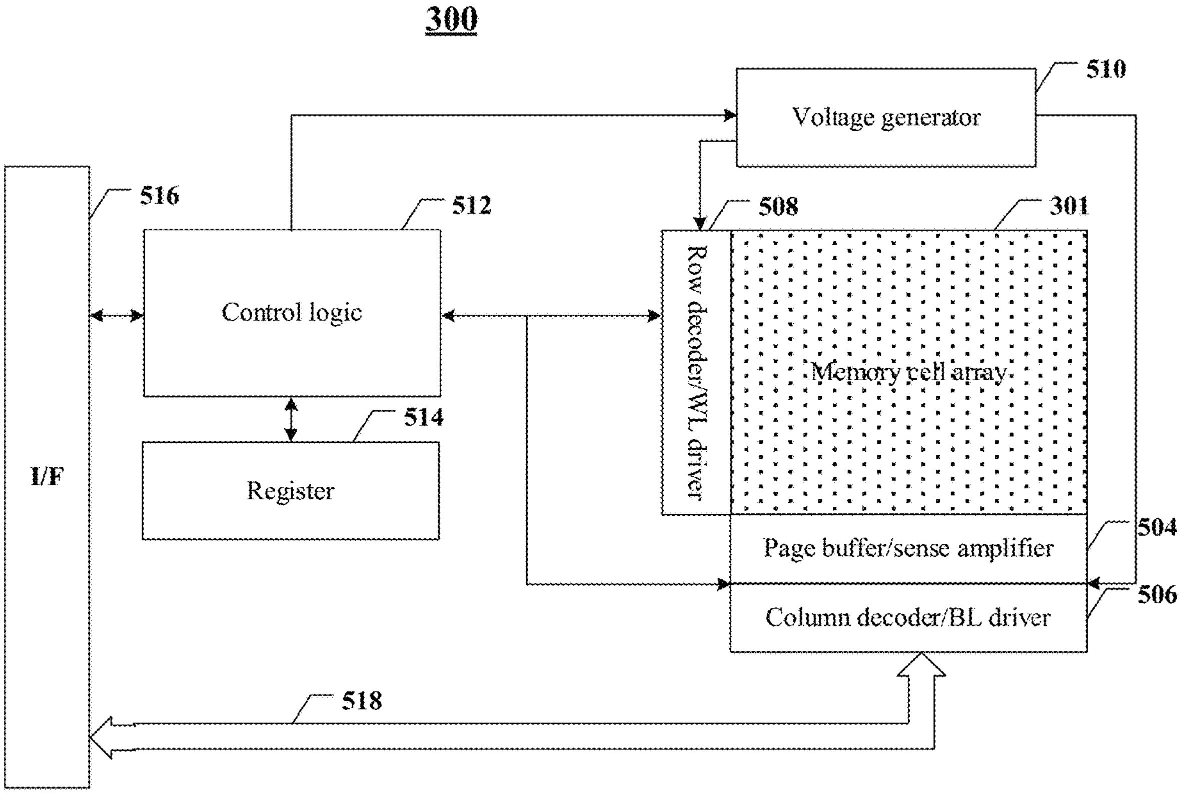
FIG. 5 is a schematic diagram of an example memory device comprising a memory cell array and a peripheral circuit according to an example of the present application.

Referring back to FIG. 3B, the peripheral circuit 302 may be coupled to the memory cell array 301 through bit lines 316, word lines 318, the source line 314, the BSG line 315, and the TSG line 313. The peripheral circuit 302 may include any suitable analog, digital, and hybrid signal circuits for facilitating operations of the memory cell array 301 by applying voltage signals and/or current signals to each target memory cell 306 and sensing voltage signals and/or current signals from each target memory cell 306 via the bit lines 316, the word lines 318, the source line 314, the BSG line 315, and the TSG line 313. The peripheral circuit 302 may include various types of peripheral circuits formed using a metal-oxide-semiconductor (MOS) technology. For example, FIG. 5 illustrates some example peripheral circuits. The peripheral circuit 302 comprises a page buffer/sense amplifier 504, a column decoder/bit line driver 506, a row decoder/word line driver 508, a voltage generator 510, a control logic 512, a register 514, an interface 516, and a data bus 518. It is to be understood that in some examples, additional peripheral circuits not shown in FIG. 5 may be included as well.

The page buffer/sense amplifier 504 may be configured to read and program (write) data from and to the memory cell array 301 according to control signals from the control logic 512. In one example, the page buffer/sense amplifier 504 may store program data (write data) to be programmed into the memory cell array 301. In another example, the page buffer/sense amplifier 504 may perform a program verify operation to ensure that the data has been properly programmed into the memory cells 306 that are coupled to the selected word line 318. In yet another example, the page buffer/sense amplifier 504 may also sense low power signals from the bit lines 316 that represent data bits stored in the memory cells 306, and amplify small voltage swings to recognizable logic levels in read operations. The column decoder/bit line driver 506 may be configured to be controlled by the control logic 512 and select one or more memory strings 308 by applying bit line voltages generated from the voltage generator 510.

The row decoder/word line driver 508 may be configured to be controlled by the control logic 512 and select/unselect the memory blocks 304 of the memory cell array 301 and select/unselect the word lines 318 of the memory blocks 304. The row decoder/word line driver 508 may be further configured to drive the word lines 318 using word line voltages generated from the voltage generator 510. In some implementations, the row decoder/word line driver 508 may also select/unselect and drive the BSG line 315 and the TSG line 313. As described in detail below, the row decoder/word line driver 508 is configured to perform program operations on the memory cells 306 coupled to (one or more) selected word lines 318. The voltage generator 510 may be configured to be controlled by the control logic 512 and generate a word line voltage (such as a read voltage, a program voltage, a pass voltage, a channel boost voltage, and a verify voltage, etc.), a bit line voltage, and a source line voltage to be supplied to the memory cell array 301.

The control logic 512 may be coupled to each of the other parts in the peripheral circuit described above and configured to control operations of each of the other parts in the peripheral circuit. The register 514 may be coupled to the control logic 512 and include a state register, a command register, and an address register for storing state information, a command operation code (OP code), and a command address for controlling operations of each peripheral circuit. The interface 516 may be coupled to the control logic 512, and act as a control buffer to buffer and relay control commands received from a host system (not shown) to the control logic 512 and state information received from the control logic 512 to the host system. The interface 516 may be also coupled to the column decoder/bit line driver 506 via the data bus 518 and act as a data I/O interface and a data buffer to buffer and relay the data to and from the memory cell array 301.

Figure 6:
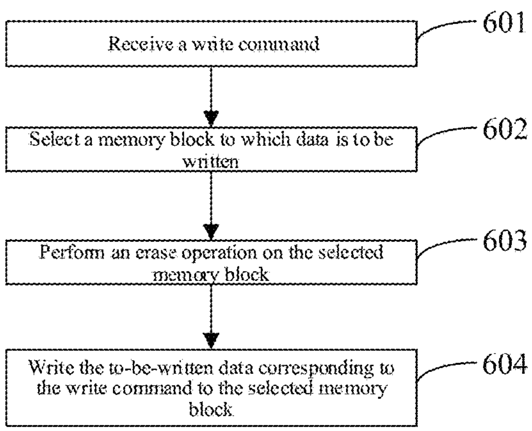
FIG. 6 is an implementation flow diagram I of an operation method of a memory system provided by an example of the present application.

In some examples, the memory system performs a read operation as shown in FIG. 6. The memory controller is configured to: operation 601: receive a write command; operation 602: select a memory block to which data is to be written; operation 603: perform an erase operation on the selected memory block; and operation 604: write the to-be-written data corresponding to the write command to the selected memory block. In this example, the erase operation is closely associated with the program operation (i.e., writing data), and the program operation starts immediately following the erase operation. That is, an Erase Program Interval (EPI) after the erase operation and before the program operation is very short, and time during which the memory cell in the memory device is in an erased state is very short. Here, a process after the erase operation and before the program operation is referred to as an erased state retention process.

Figure 7:
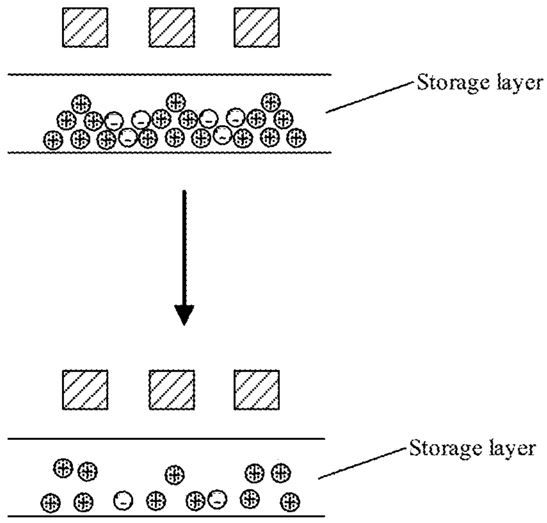
FIG. 7 is a schematic diagram of variation situations of holes and electrons in a storage layer after undergoing an erased state retention process provided by an example of the present application.
Figure 8:
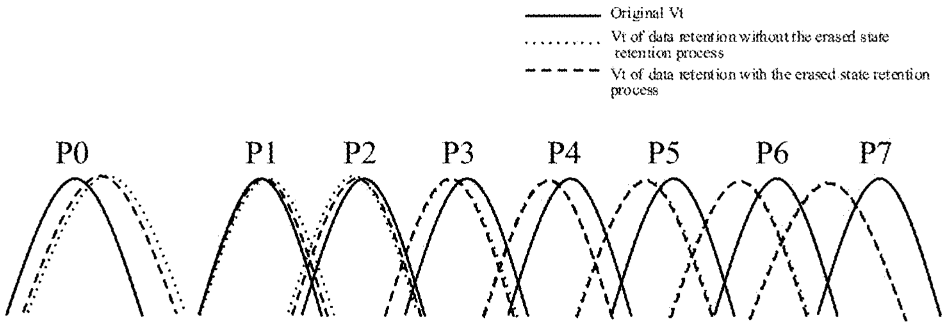
FIG. 8 is a schematic diagram of corresponding situations of an original threshold voltage offset of a memory cell, a threshold voltage offset of data retention without the erased state retention process, and a threshold voltage offset of data retention without the erased state retention process provided by an example of the present application.

Upon researches, it is found that, as shown in FIG. 7, the memory device has fewer electrons and fewer holes in the storage layer due to a loss/recombination of the erase operation while being in the erased state during the erase program interval, and only fewer holes may be lost during a subsequent data retention process. Therefore, a threshold voltage drift of the memory cell is small. Further, a solid line in FIG. 8 represents an original threshold voltage distribution Vt, a thin dashed line represents a threshold voltage distribution Vt of data retention without the erased state retention process, and a thick dashed line represents a threshold voltage distribution Vt of data retention with the erased state retention process. As can be seen from FIG. 8, thin dashed lines of P0, P1, and P2 drift farther than thick dashed lines, and drifts of thin dashed lines of P3 to P7 are similar to those of thick dashed lines. Overall, the threshold voltage distribution of the data retention without the erased state retention process has a larger drift than the threshold voltage distribution of the data retention with the erased state retention process. In other words, the memory block retains the erased state for a period of time prior to the program operation is favorable to the data retentivity of the subsequent program operation (write operation).

Upon researches, it is also found that, a longer erased state retention duration and a higher temperature during the retention process are more favorable to the data retentivity of the subsequent program operation. A data retention parameter used to characterize the data retentivity is related to the erased state retention duration and a temperature variation during the retention process. On that basis, in various examples of the present application, by selecting a first memory block with a maximum data retention parameter i.e., a first memory block with best data retentivity, from first memory blocks at least partly being in the erased state as a memory block for data writing, the retentivity with respect to the written data may be caused to be at a good level, and accordingly, the reliability of the data stored in the memory system may be improved.

Examples of the present application provide a memory system. The memory system 102 comprises: a memory device 104 comprising a plurality of memory blocks; and a memory controller 106 coupled with the memory device 104 and configured to: in response to a write command, based on a data retention parameter of each of the memory blocks, determine a second memory block from a plurality of first memory blocks among the plurality of memory blocks, the first memory blocks being at least partly in an erased state, wherein the second memory block is a first memory block with a maximum data retention parameter among the plurality of first memory blocks; and write to-be-written data to the second memory block.

Figure 9:
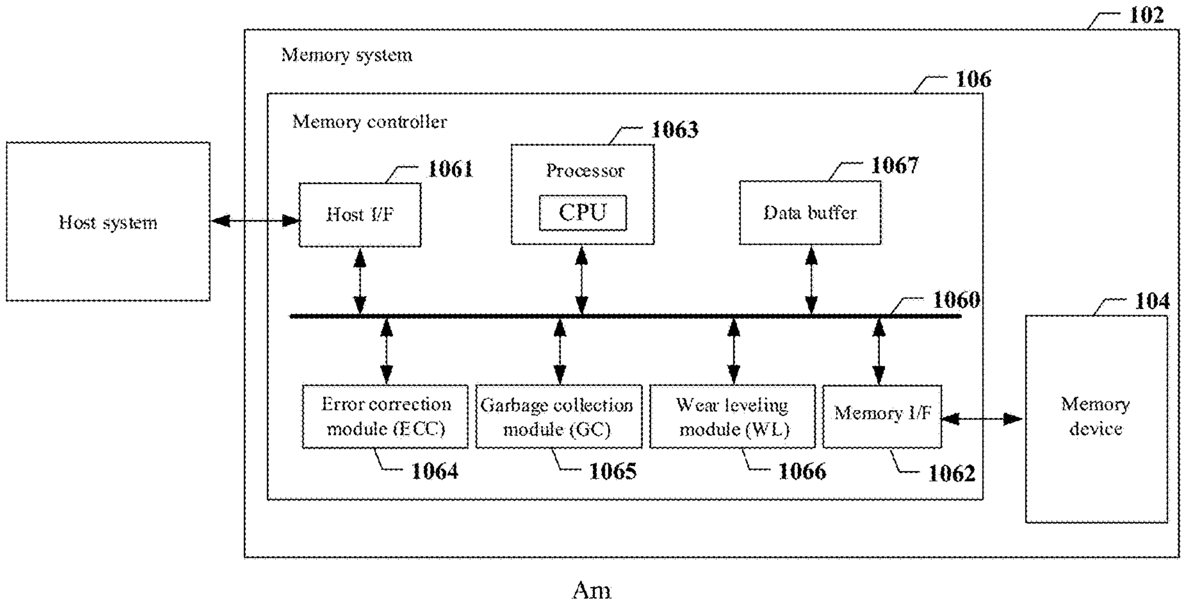
FIG. 9 is a schematic structural diagram of an example constitution having a memory system provided by an example of the present application.

In some examples, as shown in FIG. 9, the memory system 102 is coupled with the host system and performs various types of feedback in response to instructions of the host system. The memory system 102 may comprise: the memory controller 106 and the memory device 104. The memory controller 106 is configured to control the memory device 104 to perform operations such as read, write, and erase, etc., and the memory controller 106 and the memory device 104 may also be coupled in any suitable manner.

The memory controller 106 may comprise a host interface (I/F) 1061, a memory interface (I/F) 1062, a processor 1063, an error correction module 1064, a garbage collection module 1065, a wear leveling module 1066, a data buffer 1067, and a bus 1060. The host interface 1061 is a connecting interface connecting the host system 108 and the memory controller 106. The host interface 1061 allows the host system to communicate with the memory controller, send read and write requests, and perform other operations according to example protocols. The memory interface 1062 is a connecting interface between the memory controller 106 and the memory device 104, and the memory interface 1062 is configured to implement data transmission between the memory controller 106 and the memory device 104. The processor 1063 is configured to control the memory system 102 integrally, and in some examples, the processor 1063 is, for example, a Central Processing Unit (CPU), a microprocessor (MCU), or the like. The error correction module 1064 may further comprise an encoding portion and a decoding portion. The encoding portion is configured to encode to-be-stored data to obtain check data, and the decoding portion is configured to decode the check data to detect, so as to detect and correct possible error data during data transmission.

The garbage collection module 1065 is configured to, after a storage space of the memory device reaches a certain threshold, read and rewrite valid data on some memory blocks and label these memory blocks to obtain new spare memory blocks. A general implementation of garbage collection may be divided into three operations: selecting a source memory block having less valid data thereon; finding the valid data from the source memory block; and writing the valid data to a target memory block. At this time, all the data in the source memory block becomes invalid, and the source memory block is labeled and may be used as a new spare memory block. The wear leveling module 1066 is configured to keep the wear (erase count) of each memory block in the memory system level through data statistics and algorithms. A general implementation of wear leveling may be divided into two operations: selecting a source memory block having cold data thereon; and reading the valid data on the source memory block and writing the valid data to a memory block with a relatively large erase count, at which time the valid data in the source memory block becomes invalid and labeled. The data buffer 1067 may be configured to buffer data.

The memory device 104 and the memory block both may be understood with reference to an example structure and an example operation mode of the above memory device 104, which are no longer repeated here.

In this example, the memory controller 106 is configured to: receive the write command from the host system; in response to the write command, select the second memory block from the plurality of first memory blocks at least partly being in the erased state as a memory block to which data is to be written; and write the to-be-written data corresponding to the write command to the selected memory block.

Here, the memory controller 106 selects the memory block to which data is to be written from the first memory blocks at least partly being in the erased state. That is, during memory block selection in this example, part of the memory block is already in the erased state or all of the memory block is already in the erased state.

It is to be noted that in the implementation illustrated in above FIG. 6, after the response to the write command, the memory block to be written is selected first, followed by an erase operation on the selected memory block, and finally the data is written. This example differs from the solution in the implementation illustrated in above FIG. 6 in that, the memory blocks for selection are the first memory blocks at least partly being in the erased state, that is, in this example, the first memory blocks may be already in the erased state before the write command is received.

Here, the plurality of first memory blocks are some of the plurality of memory blocks of the memory device 104. The first memory blocks at least partly being in the erased state comprise a plurality of situations.

In some examples, a first memory block comprises at least one of the following: a memory block having no data written therein; a memory block having dummy data written therein and the dummy data having been erased; or a memory block having user data written therein, wherein at least part of the user data is invalid data and the invalid data has been erased.

Here, the first memory block may be the memory block having user data written therein, wherein at least part of the user data is invalid data and the invalid data has been erased. For a memory block having user data written therein, the data stored in the memory block having user data written therein comprises valid data and invalid data. In some examples, the valid data comprises data not erased by the host system, data not indicated by the host system as to be erased, data not updated by the host system, or data not rewritten by the host system, etc. The invalid data is on the contrary to the valid data. In some examples, the invalid data comprises data erased by the host system, data indicated by the host system as to be erased, data updated by the host system, or data rewritten by the host system.

In an example, the first memory block may be a memory block that has all the user data written therein being invalid data and is subjected to an erase operation. At this time, all of the memory block is in the erased state.

In an example, the first memory block may be a memory block having part of user data written therein being invalid data and the invalid data having been erased. It is to be noted that during the erase operation on a memory device, a basic unit for erase may be the entire memory block or may be a portion of the memory block. Here, when a portion of the written user data is invalid data, a physical space within the memory block occupied by the invalid data to be erased is required to be greater than or equal to a physical space within the memory block occupied by the basic unit for erase (here, the basic unit for erase is a portion of the memory block).

It is considered that a longer erased state retention duration and a higher temperature during the retention process are more favorable to the data retentivity of the subsequent program operation. Upon determining that an amount of invalid data on a certain memory block is greater than or equal to the physical space within the memory block occupied by the basic unit for erase, an erase operation may be performed on the memory block.

On that basis, in some examples, the memory controller 106 is configured to: upon determining that at least part of user data written to a memory block having the user data written therein among the plurality of memory blocks is invalid, perform an erase operation on the memory block having the user data written therein.

It may be understood that since the erase operation has been performed in the implementation, subsequently the erase operation on the selected memory block after reception of the write command of the host system is saved, thus improving the efficiency of a write operation of the memory system, i.e., improving the write performance.

It is to be noted that an invalid data erasing solution in the examples of the present application has a different operation mode compared with the above garbage collection module and the wear leveling module. In the above garbage collection and the wear leveling, after the valid data on the source memory block is removed, the valid data on the source memory block becomes invalid, and the source memory block is labeled and subsequently subjected to an erase operation when determined as the selected memory block before a write operation. According to the solution in the examples of the present application, erasing is performed directly when the invalid data in the memory block reaches a minimum erase unit, rather than performing the labeling only, so that no further erase operation is performed subsequently before the write operation. The first memory block may also be a memory block having dummy data written therein and the dummy data having been erased. The dummy data here is not user data, but data of no practical significance written to the memory block before a memory leaving a factory, in order to satisfy some needs of the memory. These memory blocks having the data written therein are also first memory blocks after subjected to an erase operation.

It is considered that a longer erased state retention duration and a higher temperature during the retention process are more favorable to the data retentivity of the subsequent program operation. If none of the memory blocks is in the erased state when the memory system leaves the factory, an erase operation is performed on all the memory blocks at initial power-on after the memory system leaves the factory, and a temperature variation situation experienced by each memory block in the erased state is recorded to provide a basis for subsequent calculation of a data retention parameter.

On that basis, in some examples, the memory controller 106 is configured to: if all the memory blocks have the dummy data written therein when the memory system leaves a factory, perform an erase operation on all the memory blocks at initial power-on after the memory system leaves the factory.

The first memory block may also be a memory block having no data written therein, and the memory block having no data written therein may be also referred to a blank memory block or idle memory block. Such memory blocks may be in the erased state when the memory system 102 leaves the factory, and remain in the erased state until being enabled after leaving the factory. These memory blocks may also be memory blocks that are detected as being in the erased state when the memory system is powered off after the erase operation and is currently powered on again.

It is to be noted that during writing of the user data to the memory device, a new memory block is typically enabled after one memory block is full. The new memory block required to be enabled may be determined upon comprehensive consideration of data retention parameters of all current blank memory blocks of the memory system, the memory block having dummy data written therein and the dummy data having been erased, and at least part of the user data written is invalid data and the invalid data having been erased.

In some examples, a data amount of the to-be-written data corresponding to the write command is greater than a preset threshold.

The write command may comprise logical addresses and the corresponding to-be-written data. Here, the logical addresses included in the write command are consecutive and have a long logical address length. In an example, the data amount of the to-be-written data corresponding to the logical addresses is greater than or equal to a capacity of one memory block, or less than but close to the capacity of one memory block. That is, the preset threshold here is the capacity of one memory block or slightly less than the capacity of one memory block.

It may be understood that when the data amount of the to-be-written data corresponding to the write command is greater than the preset threshold, it is considered there is much data to be written. In the examples of the present application, upon determining that at least part of user data written to a memory block having the user data written therein among the plurality of memory blocks is invalid, an erase operation is performed on the memory block having the user data written therein for subsequent use, so that the write performance improvement and reliability improvement produced by a solution saving the erase operation after the subsequent response to the write command are more significant.

In some examples, the memory controller is configured to: upon receiving the write command, determine a data retention parameter of each first memory block for characterizing data retention performance of the respective first memory block, wherein a larger data retention parameter indicates better data retentivity of the respective first memory block; and determine a first memory block with the maximum data retention parameter from the plurality of first memory blocks as the second memory block, where the second memory block is the memory block to which the data is to be written.

An example way to determine the data retention parameter will be described in detail below.

In some examples, the memory controller 106 is configured to: in response to initial power-on of the memory block having no data written therein or completion of an erase operation on a memory block for the erase operation, acquire a characteristic operating temperature of the memory system; acquire a retention duration during which the first memory blocks are at least partly in the erased state; and based on the characteristic operating temperature of the memory system and the retention duration during which the first memory blocks are at least partly in the erased state, determine data retention parameters of the first memory blocks.

Here, the acquisition of data used to calculate the data retention parameter may start from the initial power-on of the memory block having no data written therein or the completion of the erase operation on the memory block for the erase operation. The memory block for the erase operation may be the memory block having dummy data written therein and the dummy data having been erased, or the memory block having user data written therein, wherein at least part of the user data is invalid data and the invalid data has been erased. Here, the retention duration during which the first memory blocks are at least partly in the erased state may be understood as a time difference between the initial powering-up of the memory block having no data written therein or the moment of completing the erase operation on the memory block for the erase operation and the moment of receiving the write command. The characteristic operating temperature of the memory system may be an operating temperature at the erase completion moment or an average temperature in the retention duration during which the first memory blocks are at least partly in the erased state.

In some examples, when the first memory blocks are at least partly in the erased state, the characteristic operating temperature of the memory system experiences a plurality of temperature intervals; the memory controller 106 is configured to: acquire a characteristic operating temperature of the memory system in each temperature interval; acquire a retention duration corresponding to each of the plurality of temperature intervals; sequentially determine a data retention sub-parameter corresponding to each temperature segment in the plurality of temperature intervals, wherein, for each temperature segment, the data retention sub-parameter corresponding to the respective temperature segment is determined based on the characteristic operating temperature of the memory system in the respective temperature interval and the retention duration corresponding to the respective temperature interval; and calculate a sum of data retention sub-parameters corresponding to each temperature segment to obtain the data retention parameters of the first memory blocks.

Here, the characteristic operating temperature of the memory system may be: an operating temperature first collected upon entering into each temperature interval, or an average temperature corresponding to each temperature interval, or a designated temperature in each temperature interval. Accordingly, the retention duration during which the respective first memory block is at least partly in the erased state is divided into retention durations corresponding to each of the plurality of temperature intervals, based on the plurality of temperature intervals it experiences.

In the case of experiencing a plurality of temperature sub-intervals, a data retention sub-parameter corresponding to each temperature sub-interval may be calculated sequentially, and then a sum of a plurality of data retention sub-parameters is calculated to obtain a final data retention parameter. The way to calculate in the case of no temperature sub-interval or one temperature sub-interval is similar to above.

In some examples, the memory controller 106 is configured so that: the data retention parameter, the characteristic operating temperature of the memory system, and the retention duration have the following relational expression:

$$\frac{t_{T1}}{t_{T2}} = \exp\left(\frac{Ea}{k}\left(\frac{1}{T1} - \frac{1}{T2}\right)\right)$$

wherein $t_{T1}$ is the data retention parameter, $t_{T2}$ is the retention duration, T1 is a reference temperature, T2 is the characteristic operating temperature of the memory system, Ea is a life coefficient, and k is the Boltzmann constant.

In the examples of the present application, a formula is used to calculate the data retention parameter, so as to predict a data retentivity performance situation of the respective memory block, wherein a larger data retention parameter indicates better corresponding data retentivity performance. In the above way to calculate, all the characteristic operating temperatures of the memory system are normalized to the reference temperature T1 for calculation. In an example, the reference temperature T1 may be 40° C. Here, Ea is the life factor in units of electronvolts, which is associated with stored data bits of the memory cell. In an example, Ea is 1 electronvolt.

In the examples of the present application, in response to the initial power-on of the memory block having no data written therein or the completion of the erase operation on the memory block for the erase operation, the characteristic operating temperature (T2) of the memory system is acquired; the retention duration ($t_{T2}$) of the characteristic operating temperature of the memory system is acquired; and the data retention parameter $t_{T1}$ is calculated through substitution with the characteristic operating temperature (T2) of the memory system and the retention duration ($t_{T2}$) in the above calculation formula.

In some examples, an operating temperature range of the memory system 102 may be divided into a plurality of temperature intervals, for example, a rated operating temperature range (e.g., −20° C.-80° C.) of the memory system 102 is divided into temperature intervals of 80° C.-60° C., 60° C.-40° C., 40° C.-20° C., 20° C.-0° C., and 0° C.-(−20° C.). The retention duration during which the first memory blocks are at least partly in the erased state experiences part or all of the above multiple temperature intervals. In response to the initial power-on of the memory block having no data written therein or the completion of the erase operation on the memory block for the erase operation, the retention duration of the characteristic operating temperature of the memory system in a certain temperature interval is recorded; the data retention sub-parameters $t_{T1}'$ corresponding to each temperature interval are calculated through substitution with the characteristic operating temperature of the memory system and the retention duration ($t_{T2}$) corresponding to each temperature interval in the above calculation formula, and a sum of the data retention sub-parameters $t_{T1}'$ corresponding to each temperature interval is calculated to obtain the data retention parameter of the respective first memory block.

It is to be noted that, T2 to be substituted in the formula for each temperature interval may be a recorded value of the temperature of the memory system that enters a certain temperature interval initially. For example, when temperatures are collected periodically, a temperature collected initially as the temperature of the memory system enters the temperature interval 60° C.-40° C. is 55° C., and then 55° C. acts as T2 to be substituted in the formula for calculation. T2 to be substituted in the formula for each temperature interval may also be a designated value or preset value set for each temperature interval. For example, a preset value for 80° C.-60° C. is 80° C., a preset value for 60° C.-40° C. is 60° C., a preset value for 40° C.-20° C. is 40° C., a preset value for 20° C.-0° C. is 20° C., and a preset value for 0° C.-(−20° C.) is 0° C., wherein these preset values each act as T2 to be substituted in the formula for calculation. T2 to be substituted in the formula for each temperature interval may further be an average of each temperature interval. Accordingly, $t_{T2}$ to be substituted in the formula for each temperature interval may be a time difference between initial entering of the recorded temperature of the memory system into a certain temperature interval and initial entering into a next temperature interval.

In some examples, the memory system 102 further comprises: a temperature sensor, the temperature sensor configured to: collect operating temperatures of the memory system. The memory controller 106 is configured to: based on the operating temperatures collected by the temperature sensor, determine a plurality of operating temperatures of the memory system, from the initial powering-up of the memory block having no data written therein or a moment of completing the erase operation on the memory block for the erase operation to a moment of receiving the write command; and use an operating temperature of the memory system at the erase completion moment or an average of operating temperatures during the retention duration as the characteristic operating temperature of the memory system.

Here, the temperature sensor may be utilized to record the operating temperatures of the memory system. There may be one or more temperature sensors. In recording or collecting respective operating temperatures of the memory system, the plurality of first memory blocks at least partly in the erased state may share measurements of one temperature sensor, or adopt an average of measurements of a plurality of temperature sensors. The memory controller may acquire collected temperature values periodically from the temperature sensors. An example acquisition period may be adjusted according to an actual situation, the acquisition period is to be set in relation to a typical temperature variation rate of the memory system, and in an example may be related to the setting of the temperature interval. For example, for one temperature interval, typically, a respective number of temperature values are required to be collected in order to implement effective collection, and thus a respective period setting should meet the collection of the temperature values of that data amount.

In some examples, the temperature sensor is coupled with the memory controller 106, and may be various types of temperature sensors that are easily integrated into the memory system 102, which may collect temperatures and transmit the collected temperatures to the memory controller 106.

In some examples, the memory system 102 further comprises: a timer, the timer configured to: record a time difference, wherein the memory controller is configured to: based on the time difference recorded by the timer, determine a time difference for the first memory blocks between the initial powering-up of a memory block having no data written therein or a moment of completing the erase operation on the memory block for the erase operation and a moment of receiving the write command; and use the determined time difference as the retention duration.

Here, the time difference for the first memory blocks between the initial powering-up of the memory block having no data written therein or the moment of completing the erase operation on the memory blocks for the erase operation and the moment of receiving the write command may be recorded using the timer. There may be one or more timers. Each of the plurality of timers may be configured to record a time difference for one first memory block respectively.

In some examples, the timer may record example moments, e.g., a moment (timestamp) of the initial powering-up of the memory block having no data written therein or of completing the erase operation on the memory block for the erase operation for the first memory block, and the moment (timestamp) of receiving the write command for the first memory block, and calculate a difference between the example moments to obtain the time difference. The timer may also start at an example moment, e.g., the moment of the initial powering-up of the memory block having no data written therein or of completing the erase operation on the memory block for the erase operation for the first memory block, and end at a next example moment, e.g., the moment of receiving the write command for the first memory block, thus obtaining a time difference therebetween directly.

In some examples, the timer can be integrated directly into firmware of the memory system.

Figure 10:
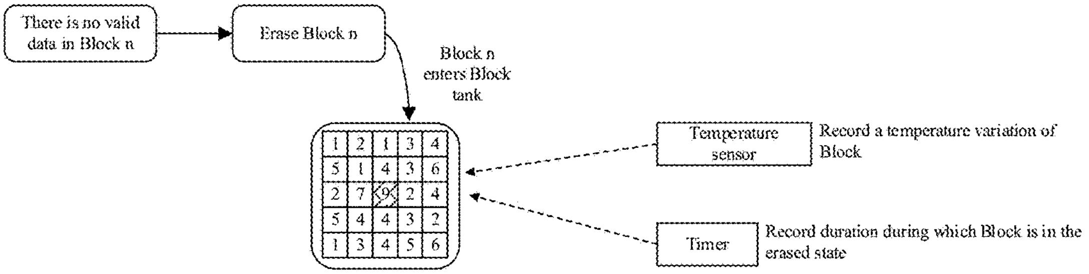
FIG. 10 is a schematic diagram of a process of a memory block entering a memory block tank provided by an example of the present application.

In an example, as shown in FIG. 10, when all the data in a certain memory block (Block n) is invalid, i.e., there is no valid data, an erase operation is performed on the Block n, and the Block n subjected to the erase operation is placed into a memory block tank. A temperature variation of each memory block in the memory block tank is required to be recorded using the temperature sensor, and a duration during which each memory block is in the erased state is recorded using the timer. It is to be noted that the above memory block having no data written therein and the memory block having dummy data written therein and the dummy data having been erased both can be placed into the memory block tank after the initial power-on, so as to monitor a temperature variation and an erased state duration thereof. Subsequently upon receiving the write command, the respective second memory block may be selected from the memory block tank.

It is to be noted that the recording of a temperature variation situation experienced by the memory block in the erased state is restarted after each erase operation on the memory block. That is, during calculation of the data retention parameter of the memory block, relevant temperature data and retention duration data recorded during a previous erase operation and after the erase operation are required to be cleared, so as to avoid a selection error caused by data accumulation.

In some examples, the memory system includes a Universal Flash Storage (UFS) device or a Solid State Disk (SSD). The memory device includes a NAND memory.

In the examples of the present application, the memory controller in the memory system performs the erase operation on the memory block once finding that invalid data in the memory block reaches the minimum erase unit, and places this memory block (the first memory block) into the memory block tank. The temperature variation is recorded using the temperature sensor, and the erased state retention duration is recorded using the timer, for subsequent use. Subsequently, in response to the write command, the memory controller calculates the data retention parameter of each first memory block in the memory block tank, determines the first memory block with the maximum data retention parameter from the plurality of first memory blocks as the second memory block, and writes the to-be-written data to the second memory block. In the examples of the present application, by selecting a first memory block with the maximum data retention parameter i.e., a first memory block with best data retentivity, from first memory blocks at least partly being in the erased state as a memory block for data writing, the retentivity with respect to the written data may be caused to be at a good level, and accordingly, the reliability of the data stored in the memory system may be improved. Meanwhile, the operation of erasing the selected memory block during the write operation may be saved, thereby improving the write performance of the memory system.

It is to be noted that, in the examples of the present application, in order to obtain better data retentivity, the erase operation is performed once it is found that the invalid data in the memory block reaches the minimum erase unit. Before the subsequent write operation, no erase operation is required to be performed. However, for a newly enabled memory block having no user data written therein, a shallow erase operation may be performed before the subsequent write operation.

Examples of the present application further provide an operation method of a memory system, which comprises: in response to a write command, based on a data retention parameter of each memory block, determining a second memory block from a plurality of first memory blocks among a plurality of memory blocks of the memory system, the first memory blocks being at least partly in an erased state, wherein the second memory block is a first memory block with a maximum data retention parameter among the plurality of first memory blocks; and writing to-be-written data to the second memory block.

Figure 11:
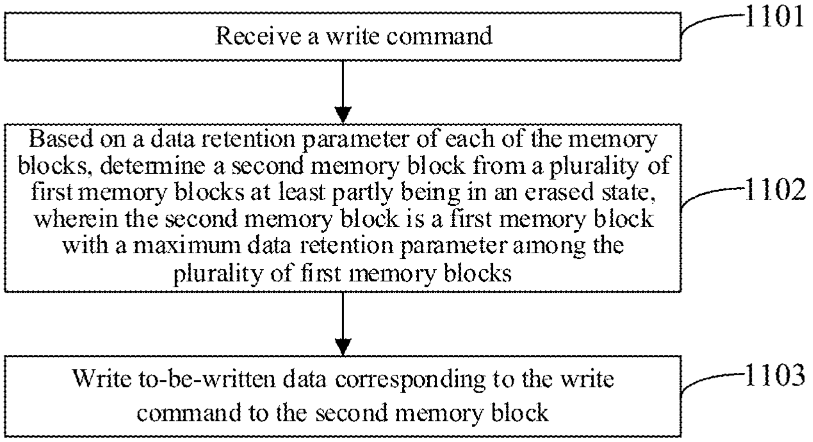
FIG. 11 is an implementation flow diagram II of an operation method of a memory system provided by an example of the present application.

In some examples, referring to FIG. 11, FIG. 11 is a flow diagram of an operation method of a memory system provided by an example of the present application. The operation method comprises the following operations:

Operation 1101: receiving a write command;

Operation 1102: based on a data retention parameter of each of the memory blocks, determining a second memory block from a plurality of first memory blocks at least partly being in an erased state, wherein the second memory block is a first memory block with a maximum data retention parameter among the plurality of first memory blocks; and Operation 1103: writing to-be-written data corresponding to the write command to the second memory block.

In some examples, a first memory block comprises at least one of the following: a memory block having no data written therein; a memory block having dummy data written therein and the dummy data having been erased; or a memory block having user data written therein, wherein at least part of the user data is invalid data and the invalid data has been erased.

In some examples, the method further comprises: upon determining that at least part of user data written to a memory block having the user data written therein among the plurality of memory blocks of the memory system is invalid, performing an erase operation on the memory block having the user data written therein.

In some examples, the method further comprises: if all the memory blocks have the dummy data written therein when the memory system leaves a factory, performing an erase operation on all the memory blocks at initial power-on after the memory system leaves the factory.

In some examples, the method further comprises: in response to initial power-on of the memory block having no data written therein or completion of an erase operation on a memory block for the erase operation, acquiring a characteristic operating temperature of the memory system; acquiring a retention duration during which the first memory blocks are at least partly in the erased state; and based on the characteristic operating temperature of the memory system and the retention duration during which the first memory blocks are at least partly in the erased state, determining data retention parameters of the first memory blocks.

In some examples, during the first memory blocks are at least partly in the erased state, the characteristic operating temperature of the memory system experiences a plurality of temperature intervals; the acquiring the characteristic operating temperature of the memory system comprises: acquiring a characteristic operating temperature of the memory system in each temperature interval; the acquiring a retention duration during which the first memory blocks are at least partly in the erased state comprises: acquiring a retention duration corresponding to each of the plurality of temperature intervals; based on the characteristic operating temperature of the memory system and the retention duration during which the first memory blocks are at least partly in the erased state, determining data retention parameters of the first memory blocks comprises: sequentially determining a data retention sub-parameter corresponding to each temperature segment in the plurality of temperature intervals, wherein, for each temperature segment, the data retention sub-parameter corresponding to the respective temperature segment is determined based on the characteristic operating temperature of the memory system in the respective temperature interval and the retention duration corresponding to the respective temperature interval; and calculating a sum of data retention sub-parameters corresponding to each temperature segment to obtain the data retention parameters of the first memory blocks.

In some examples, based on the characteristic operating temperature of the memory system and the retention duration during which the first memory blocks are at least partly in the erased state, determining data retention parameters of the first memory blocks comprises: based on the characteristic operating temperature of the memory system and the retention duration, calculating the data retention parameters of the first memory blocks according to the following relational expression:

$$\frac{t_{T1}}{t_{T2}} = \exp\left(\frac{Ea}{k}\left(\frac{1}{T1} - \frac{1}{T2}\right)\right)$$

wherein $t_{T1}$ is the data retention parameter, $t_{T2}$ is the retention duration, T1 is a reference temperature, T2 is the characteristic operating temperature of the memory system, Ea is a life coefficient, and k is the Boltzmann constant.

In some examples, the acquiring the characteristic operating temperature of the memory system comprises: based on operating temperatures of the memory system collected by a temperature sensor of the memory system, determining a plurality of operating temperatures of the memory system, from the initial powering-up of the memory block having no data written therein or a moment of completing the erase operation on the memory block for the erase operation to a moment of receiving the write command; and using an operating temperature of the memory system at the erase completion moment or an average of operating temperatures during the retention duration as the characteristic operating temperature of the memory system.

In some examples, the acquiring a retention duration during which the first memory blocks are at least partly in the erased state comprises: based on a time difference recorded by a timer of the memory system, determining a time difference for the first memory blocks between the initial powering-up of a memory block having no data written therein or a moment of completing the erase operation on the memory block for the erase operation and a moment of receiving the write command; and using the determined time difference as the retention duration.

In some examples, the invalid data comprises data indicated by a host system as to be erased, updated or rewritten.

In some examples, a data amount of the to-be-written data corresponding to the write command is greater than a preset threshold.

It is to be noted that, the operation method of the memory system in the above examples may be understood with reference to the example implementation solution determined by a storage mode as described in the memory system of the above examples.

Examples of the present application provide a storage medium having an executable instruction stored thereon, which, when executed, may implement operations of the method of the examples of the present application.

In some examples, the storage medium may be a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, a Compact Disc Read-Only Memory (CD-ROM), among other memories, or may be various apparatuses including any one or any combination of the above memory devices.

In some examples, an executable instruction may be compiled in any form of programming language (including a compiled or interpreted language, or a declarative or procedural language) by adopting a form of a program, software, a software module, a script or a code, and may be deployed in any form, including being deployed as an independent program or as a module, a component, a subroutine, or other units suitable for use in a computing environment.

As an example, the executable instruction may, but do not necessarily, correspond to files in a file system, may be stored in part of a file storing other programs or data, for example, stored in one or more scripts in a Hyper Text Markup Language (HTML) document, stored in a single file dedicated for the discussed program, or stored in a plurality of cooperative files (e.g., the file for storing one or more modules, subprograms or code portions).

As an example, the executable instruction may be deployed on an electronic apparatus for execution, or on a plurality of electronic apparatuses at one site for execution, or distributed on a plurality of electronic apparatuses interconnected through a communication network at a plurality of sites for execution.

Figure 12:
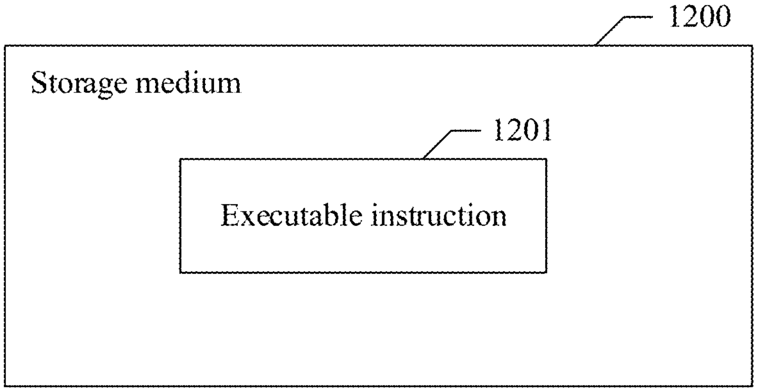
FIG. 12 is a schematic block diagram of a readable storage medium provided by an example of the present application.

FIG. 12 is a schematic block diagram of a readable storage medium provided by an example of the present application. Examples of the present application provide a readable storage medium, the storage medium 1200 storing an executable instruction 1201 which, when executed by a processor, can implement the operation method of a memory system as described in the above technical solution. The operation method comprises: based on a total amount of valid data in each of the plurality of memory blocks, determining a storage mode of the memory block, wherein in different storage modes, data read and write are performed at different rates by configuring the number of data bits stored in each memory cell in the memory block.

In view of above, examples of the present application provide a memory system and an operation method thereof, and a storage medium.

Examples of the present application provide a memory system, which comprises: a memory device comprising a plurality of memory blocks; and a memory controller coupled with the memory device and configured to: in response to a write command, based on a data retention parameter of each of the memory blocks, determine a second memory block from a plurality of first memory blocks among the plurality of memory blocks, the first memory blocks being at least partly in an erased state, wherein the second memory block is a first memory block with a maximum data retention parameter among the plurality of first memory blocks; and write to-be-written data to the second memory block.

In some examples, a first memory block comprises at least one of the following: a memory block having no data written therein; a memory block having dummy data written therein and the dummy data having been erased; or a memory block having user data written therein, wherein at least part of the user data is invalid data and the invalid data has been erased.

In some examples, the memory controller is configured to: upon determining that at least part of user data written to a memory block having the user data written therein among the plurality of memory blocks is invalid, perform an erase operation on the memory block having the user data written therein.

In some examples, the memory controller is configured to: if all the memory blocks have the dummy data written therein when the memory system leaves a factory, perform an erase operation on all the memory blocks at initial power-on after the memory system leaves the factory.

In some examples, the memory controller is configured to: in response to initial power-on of the memory block having no data written therein or completion of an erase operation on a memory block for the erase operation, acquire a characteristic operating temperature of the memory system; acquire a retention duration during which the first memory blocks are at least partly in the erased state; and based on the characteristic operating temperature of the memory system and the retention duration during which the first memory blocks are at least partly in the erased state, determine data retention parameters of the first memory blocks.

In some examples, during the first memory blocks are at least partly in the erased state, the characteristic operating temperature of the memory system experiences a plurality of temperature intervals; the memory controller is configured to: acquire a characteristic operating temperature of the memory system in each temperature interval; acquire a retention duration corresponding to each of the plurality of temperature intervals; sequentially determine a data retention sub-parameter corresponding to each temperature segment in the plurality of temperature intervals, wherein, for each temperature segment, the data retention sub-parameter corresponding to the respective temperature segment is determined based on the characteristic operating temperature of the memory system in the respective temperature interval and the retention duration corresponding to the respective temperature interval; and calculate a sum of data retention sub-parameters corresponding to each temperature segment to obtain the data retention parameters of the first memory blocks.

In some examples, the memory controller is configured so that: the data retention parameter, the characteristic operating temperature of the memory system, and the retention duration have the following relational expression:

$$\frac{t_{T1}}{t_{T2}} = \exp\left(\frac{Ea}{k}\left(\frac{1}{T1} - \frac{1}{T2}\right)\right)$$

wherein $t_{T1}$ is the data retention parameter, $t_{T2}$ is the retention duration, T1 is a reference temperature, T2 is the characteristic operating temperature of the memory system, Ea is a life coefficient, and k is the Boltzmann constant.

In some examples, the memory system further comprises: a temperature sensor, the temperature sensor configured to: collect operating temperatures of the memory system, wherein the memory controller is configured to: based on the operating temperatures of the memory system collected by the temperature sensor, determine a plurality of operating temperatures of the memory system, from the initial powering-up of the memory block having no data written therein or a moment of completing the erase operation on the memory block for the erase operation to a moment of receiving the write command; and use an operating temperature of the memory system at the erase completion moment or an average of operating temperatures during the retention duration as the characteristic operating temperature of the memory system.

In some examples, the memory system further comprises: a timer, the timer configured to: record a time difference, wherein the memory controller is configured to: based on the time difference recorded by the timer, determine a time difference for the first memory blocks between the initial powering-up of a memory block having no data written therein or a moment of completing the erase operation on the memory block for the erase operation and a moment of receiving the write command; and use the determined time difference as the retention duration.

In some examples, the invalid data comprises data indicated by a host system as to be erased, updated or rewritten.

In some examples, a data amount of the to-be-written data corresponding to the write command is greater than a preset threshold.

Examples of the present application further provide an operation method of a memory system, which comprises: in response to a write command, based on a data retention parameter of each memory block, determining a second memory block from a plurality of first memory blocks among a plurality of memory blocks of the memory system, the first memory blocks being at least partly in an erased state, wherein the second memory block is a first memory block with a maximum data retention parameter among the plurality of first memory blocks; and writing to-be-written data to the second memory block.

In some examples, a first memory block comprises at least one of the following: a memory block having no data written therein; a memory block having dummy data written therein and the dummy data having been erased; or a memory block having user data written therein, wherein at least part of the user data is invalid data and the invalid data has been erased.

In some examples, the method further comprises: upon determining that at least part of user data written to a memory block having the user data written therein among the plurality of memory blocks of the memory system is invalid, performing an erase operation on the memory block having the user data written therein.

In some examples, the method further comprises: if all the memory blocks have the dummy data written therein when the memory system leaves a factory, performing an erase operation on all the memory blocks at initial power-on after the memory system leaves the factory.

In some examples, the method further comprises: in response to initial power-on of the memory block having no data written therein or completion of an erase operation on a memory block for the erase operation, acquiring a characteristic operating temperature of the memory system; acquiring a retention duration during which the first memory blocks are at least partly in the erased state; and based on the characteristic operating temperature of the memory system and the retention duration during which the first memory blocks are at least partly in the erased state, determining data retention parameters of the first memory blocks.

In some examples, when the first memory blocks are at least partly in the erased state, the characteristic operating temperature of the memory system experiences a plurality of temperature intervals; the acquiring the characteristic operating temperature of the memory system comprises: acquiring a characteristic operating temperature of the memory system in each temperature interval; the acquiring a retention duration during which the first memory blocks are at least partly in the erased state comprises: acquiring a retention duration corresponding to each of the plurality of temperature intervals; based on the characteristic operating temperature of the memory system and the retention duration during which the first memory blocks are at least partly in the erased state, determining data retention parameters of the first memory blocks comprises: sequentially determining a data retention sub-parameter corresponding to each temperature segment in the plurality of temperature intervals, wherein, for each temperature segment, the data retention sub-parameter corresponding to the respective temperature segment is determined based on the characteristic operating temperature of the memory system in the respective temperature interval and the retention duration corresponding to the respective temperature interval; and calculating a sum of data retention sub-parameters corresponding to each temperature segment to obtain the data retention parameters of the first memory blocks.

In some examples, based on the characteristic operating temperature of the memory system and the retention duration during which the first memory blocks are at least partly in the erased state, determining data retention parameters of the first memory blocks comprises: based on the characteristic operating temperature of the memory system and the retention duration, calculating the data retention parameters of the first memory blocks according to the following relational expression:

$$\frac{t_{T1}}{t_{T2}} = \exp\left(\frac{Ea}{k}\left(\frac{1}{T1} - \frac{1}{T2}\right)\right)$$

wherein $t_{T1}$ is the data retention parameter, $t_{T2}$ is the retention duration, T1 is a reference temperature, T2 is the characteristic operating temperature of the memory system, Ea is a life coefficient, and k is the Boltzmann constant.

In some examples, the acquiring the characteristic operating temperature of the memory system comprises: based on operating temperatures of the memory system collected by a temperature sensor of the memory system, determining a plurality of operating temperatures of the memory system, from the initial powering-up of the memory block having no data written therein or a moment of completing the erase operation on the memory block for the erase operation to a moment of receiving the write command; and using an operating temperature of the memory system at the erase completion moment or an average of operating temperatures during the retention duration as the characteristic operating temperature of the memory system.

In some examples, the acquiring a retention duration during which the first memory blocks are at least partly in the erased state comprises: based on a time difference recorded by a timer of the memory system, determining a time difference for the first memory blocks between the initial powering-up of a memory block having no data written therein or a moment of completing the erase operation on the memory block for the erase operation and a moment of receiving the write command; and using the determined time difference as the retention duration.

In some examples, the invalid data comprises data indicated by a host system as to be erased, updated or rewritten.

In some examples, a data amount of the to-be-written data corresponding to the write command is greater than a preset threshold.

Examples of the present application provide a storage medium having an executable instruction stored thereon, which, when executed, may implement operations of the method of the examples of the present application.

In the examples of the present application, in response to the write command, the memory controller in the memory system determines, based on the data retention parameter of each of the memory blocks, a first memory block with the maximum data retention parameter as the second memory block from the plurality of first memory blocks among the plurality of memory blocks of the memory device in the memory system, the first memory blocks being at least partly in an erased state, and writes the to-be-written data to the second memory block. In the examples of the present application, by selecting a first memory block with a maximum data retention parameter i.e., a first memory block with best data retentivity, from first memory blocks at least partly being in the erased state as a memory block for data writing, the retentivity with respect to the written data may be caused to be at a good level, and accordingly, the reliability of the data stored in the memory system may be improved.

The method disclosed in the method examples provided by the present application may be combined freely to obtain new method examples in case of no conflicts. It is to be understood that, references to “one example” or “an example” throughout this specification mean that example features, structures, or characteristics related to the example are included in at least one example of the present application. Therefore, “in one example” or “in an example” present everywhere throughout this specification does not necessarily refer to the same example. Furthermore, these example features, structures, or characteristics may be incorporated in one or more examples in any suitable manner. It is to be understood that, in various examples of the present application, sequence numbers of the above processes do not indicate an execution sequence, and an execution sequence of various processes shall be determined by functionalities and intrinsic logics thereof, and shall constitute no limitation on an implementation process of the examples of the present application. The above sequence numbers of the examples of the present application are only for description, and do not represent advantages or disadvantages of the examples.

The methods disclosed in several method examples as provided by the present application may be combined freely to obtain new method examples in case of no conflicts.

The above descriptions are merely example implementations of the present application, but the protection scope of the present application is not limited thereto. Any variation or replacement readily figured out by those skilled in the art within the technical scope as disclosed by the present application shall fall within the protection scope of the present application. Therefore, the protection scope of the present application shall be subject to the protection scope of the claims.

What is claimed is:

1. A memory system, comprising:

a memory device including memory blocks; and a memory controller coupled with the memory device and configured to:

in response to a write command, based on a data retention parameter of each of the memory blocks, determine a second memory block from first memory blocks being at least partly in an erased state among the memory blocks, wherein the second memory block is a first memory block of the first memory blocks with a maximum data retention parameter among the first memory blocks, wherein the maximum data retention parameter corresponds to a time between an erase operation performed on the second memory block and a moment of receiving the write command; and write to-be-written data to the second memory block.

2. The memory system of claim 1, wherein the first memory block includes at least one of the following:

a memory block having no data written therein;

a memory block that had dummy data written therein and the dummy data has been erased; or a memory block that had user data written therein, wherein at least part of the user data is invalid data and the invalid data has been erased.

3. The memory system of claim 2, wherein the memory controller is configured to, upon determining that at least part of the user data written to the memory block that had the user data written therein is the invalid data, perform the erase operation on the memory block having the user data written therein.

4. The memory system of claim 2, wherein the memory controller is configured to, if the memory blocks have dummy data written therein when the memory system leaves a factory, perform the erase operation on the memory blocks at an initial power-on after the memory system leaves the factory.

5. The memory system of claim 2, wherein the memory controller is configured to:

in response to an initial power-on of the memory block having no data written therein or a completion of the erase operation on the memory block having no data written therein, acquire a characteristic operating temperature of the memory system;

acquire a retention duration during which the first memory blocks are at least partly in the erased state; and based on the characteristic operating temperature of the memory system and the retention duration during which the first memory blocks are at least partly in the erased state, determine data retention parameters of the first memory blocks.

6. The memory system of claim 5, wherein, when the first memory blocks are at least partly in the erased state, the characteristic operating temperature of the memory system experiences temperature intervals, and the memory controller is configured to:

acquire the characteristic operating temperature of the memory system in each temperature interval of the temperature intervals;

acquire the retention duration corresponding to each of the temperature intervals;

sequentially determine a data retention sub-parameter corresponding to each temperature segment of the temperature intervals, wherein, for each temperature segment, the data retention sub-parameter corresponding to the temperature segment is determined based on the characteristic operating temperature of the memory system in the temperature interval and the retention duration corresponding to the temperature interval; and calculate a sum of data retention sub-parameters corresponding to each temperature segment to obtain the data retention parameters of the first memory blocks.

7. The memory system of claim 5, wherein a data retention parameter of the data retention parameters of the first memory blocks, the characteristic operating temperature of the memory system, and the retention duration have the following relational expression:

$$\frac{t_{T1}}{t_{T2}} = \exp\left(\frac{Ea}{k\left(\frac{1}{T1} - \frac{1}{T2}\right)}\right)$$

wherein $t_{T1}$ is the data retention parameter, $t_{T2}$ is the retention duration, T1 is a reference temperature, T2 is the characteristic operating temperature of the memory system, Ea is a life coefficient, and k is Boltzmann constant.

8. The memory system of claim 5, further including a temperature sensor configured to collect operating temperatures of the memory system, wherein the memory controller is configured to:

based on the operating temperatures of the memory system collected by the temperature sensor, determine the operating temperatures of the memory system from initial power-on of the memory block having no data written therein or a moment of completing the erase operation on the memory block having no data written therein to the moment of receiving the write command; and use an operating temperature of the operating temperatures of the memory system at the moment of completing the erase operation or an average of the operating temperatures during the retention duration as the characteristic operating temperature of the memory system.

9. The memory system of claim 5, further including a timer configured to record a time difference, wherein the memory controller is configured to:

based on the time difference recorded by the timer, determine the time difference for the first memory blocks between the initial power-on of the memory block having no data written therein or a moment of completing the erase operation on the memory block and the moment of receiving the write command; and use the determined time difference as the retention duration.

10. The memory system of claim 2, wherein the invalid data includes data indicated by a host system as to be erased, updated, or rewritten.

11. A method of operating a memory system, comprising:

in response to a write command, based on a data retention parameter of each memory block of memory blocks of the memory system, determining a second memory block from first memory blocks being at least partly in an erased state among the memory blocks, wherein the second memory block is a first memory block of the first memory blocks with a maximum data retention parameter among the first memory blocks, wherein the maximum data retention parameter corresponds to a time between an erase operation performed on the second memory block and a moment of receiving the write command; and writing to-be-written data to the second memory block.

12. The method of claim 11, wherein the first memory block includes at least one of the following:

a memory block having no data written therein;

a memory block that had dummy data written therein and the dummy data has been erased; or a memory block that had user data written therein, wherein at least part of the user data is invalid data and the invalid data has been erased.

13. The method of claim 12, further including, upon determining that at least part of the user data written to the memory block that had the user data written therein is the invalid data, performing the erase operation on the memory block having the user data written therein.

14. The method of claim 12, further including, if the memory blocks have dummy data written therein when the memory system leaves a factory, performing the erase operation on the memory blocks at an initial power-on after the memory system leaves the factory.

15. The method of claim 12, further including:

in response to an initial power-on of the memory block having no data written therein or a completion of the erase operation on the memory block having no data written therein, acquiring a characteristic operating temperature of the memory system;

acquiring a retention duration during which the first memory blocks are at least partly in the erased state; and based on the characteristic operating temperature of the memory system and the retention duration during which the first memory blocks are at least partly in the erased state, determining data retention parameters of the first memory blocks.

16. The method of claim 15, wherein, when the first memory blocks are at least partly in the erased state, the characteristic operating temperature of the memory system experiences temperature intervals, and the acquiring the characteristic operating temperature of the memory system includes acquiring the characteristic operating temperature of the memory system in each temperature interval of the temperature intervals;

the acquiring the retention duration during which the first memory blocks are at least partly in the erased state includes acquiring the retention duration corresponding to each of the temperature intervals;

based on the characteristic operating temperature of the memory system and the retention duration during which the first memory blocks are at least partly in the erased state, determining the data retention parameters of the first memory blocks includes:

sequentially determining a data retention sub-parameter corresponding to each temperature segment of the temperature intervals, wherein, for each temperature segment, the data retention sub-parameter corresponding to the temperature segment is determined based on the characteristic operating temperature of the memory system in the temperature interval and the retention duration corresponding to the temperature interval; and calculating a sum of data retention sub-parameters corresponding to each temperature segment to obtain the data retention parameters of the first memory blocks.

17. The method of claim 15, wherein based on the characteristic operating temperature of the memory system and the retention duration during which the first memory blocks are at least partly in the erased state, determining the data retention parameters of the first memory blocks includes, based on the characteristic operating temperature of the memory system and the retention duration, calculating the data retention parameters of the first memory blocks according to the following relational expression:

$$\frac{t_{T1}}{t_{T2}} = \exp\left(\frac{Ea}{k\left(\frac{1}{T1} - \frac{1}{T2}\right)}\right)$$

wherein $t_{T1}$ is the data retention parameter of the data retention parameters, $t_{T2}$ is the retention duration, T1 is a reference temperature, T2 is the characteristic operating temperature of the memory system, Ea is a life coefficient, and k is Boltzmann constant.

18. The method of claim 15, wherein the acquiring the characteristic operating temperature of the memory system includes:

based on operating temperatures of the memory system collected by a temperature sensor of the memory system, determining the operating temperatures of the memory system from initial power-on of the memory block having no data written therein or a moment of completing the erase operation on the memory block having no data written therein to the moment of receiving the write command; and using an operating temperature of the operating temperatures of the memory system at the moment of completing the erase operation or an average of the operating temperatures during the retention duration as the characteristic operating temperature of the memory system.

19. The method of claim 15, wherein the acquiring the retention duration during which the first memory blocks are at least partly in the erased state includes:

based on a time difference recorded by a timer of the memory system, determining the time difference for the first memory blocks between the initial power-on of the memory block having no data written therein or a moment of completing the erase operation on the memory block and the moment of receiving the write command; and using the determined time difference as the retention duration.

20. A non-transitory storage medium, having an executable instruction stored thereon, which, when executed, can implement operations of a method of operating a memory system, the method comprising:

in response to a write command, based on a data retention parameter of each memory block of memory blocks of the memory system, determining a second memory block from first memory blocks being at least partly in an erased state among the memory blocks, wherein the second memory block is a first memory block of the first memory blocks with a maximum data retention parameter among the first memory blocks, wherein the maximum data retention parameter corresponds to a time between an erase operation performed on the second memory block and a moment of receiving the write command; and writing to-be-written data to the second memory block.

* * * * *